United States Patent
Li

(10) Patent No.: US 11,031,876 B1
(45) Date of Patent: Jun. 8, 2021

(54) FLYBACK CIRCUIT WITH ENERGY RECYCLING AND CONTROL METHOD THEREOF

(71) Applicant: Monolithic Power Systems, Inc., San Jose, CA (US)

(72) Inventor: Yancun Li, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 16/928,172

(22) Filed: Jul. 14, 2020

(51) Int. Cl.
*H02M 3/335* (2006.01)

(52) U.S. Cl.
CPC .............................. *H02M 3/33576* (2013.01)

(58) Field of Classification Search
CPC .................. H02M 3/33507–33523; H02M 3/33569–33592
See application file for complete search history.

(56) References Cited

U.S. PATENT DOCUMENTS

| | | | | |
|---|---|---|---|---|
| 5,430,633 A * | 7/1995 | Smith | ............... | H02M 3/33569 363/20 |
| 8,368,320 B2 * | 2/2013 | Kuang | ............... | H05B 41/2855 315/291 |
| 8,576,588 B2 * | 11/2013 | Kuang | ............... | H05B 45/3725 363/21.16 |
| 8,625,251 B2 * | 1/2014 | Urienza | ............... | H02M 1/44 361/220 |
| 9,991,803 B1 * | 6/2018 | Wang | ............... | H02M 1/34 |
| 10,103,616 B1 * | 10/2018 | Lin | ............... | H02M 1/083 |
| 10,177,670 B1 * | 1/2019 | Lin | ............... | H02M 1/083 |
| 10,985,665 B1 * | 4/2021 | Yan | ............... | H02M 3/158 |
| 2014/0307484 A1 * | 10/2014 | Yang | ............... | H02M 3/33569 363/21.12 |
| 2015/0003121 A1 * | 1/2015 | Yang | ............... | H02M 3/33569 363/21.17 |
| 2017/0070152 A1 * | 3/2017 | Liu | ............... | H02M 3/33515 |
| 2018/0069480 A1 * | 3/2018 | Koo | ............... | H02M 1/32 |
| 2018/0131286 A1 * | 5/2018 | Song | ............... | H02M 3/33592 |
| 2018/0287481 A1 * | 10/2018 | Liu | ............... | H02M 3/156 |
| 2018/0294734 A1 * | 10/2018 | Song | ............... | H02M 1/083 |
| 2018/0301975 A1 * | 10/2018 | Lin | ............... | H02M 1/083 |
| 2019/0036446 A1 * | 1/2019 | Yang | ............... | H02M 1/34 |
| 2020/0014303 A1 * | 1/2020 | Song | ............... | H02M 3/33569 |
| 2020/0091826 A1 * | 3/2020 | Yang | ............... | H02M 3/33523 |

(Continued)

*Primary Examiner* — Yusef A Ahmed
(74) *Attorney, Agent, or Firm* — Perkins Coie LLP

(57) ABSTRACT

An energy recycle circuit for a flyback circuit and method thereof. The energy recycle circuit has an auxiliary switch coupled in series to a clamp capacitor to form a branch, and the branch is coupled in parallel with the primary winding, or with the primary switch. The energy recycle circuit further has a recycle control circuit to generate an auxiliary switching signal. The auxiliary switch is turned on during a charging process of the clamp capacitor, and is turned off at an end of an immediate subsequent discharging process of the clamp capacitor. The charging process of the clamp capacitor is timed at a first length of time, and the immediate subsequent discharging process of the clamp capacitor is timed at a second length of time, based on an auxiliary switch current signal. The second length of time is adjustable to have an equal time length with the first length of time, or have a unequal time length with the first length of time.

11 Claims, 7 Drawing Sheets

(56) References Cited

U.S. PATENT DOCUMENTS

| | | | | |
|---|---|---|---|---|
| 2020/0328669 A1* | 10/2020 | Yang | ................ | H02M 3/33507 |
| 2020/0336073 A1* | 10/2020 | Bianco | .............. | H02M 3/33592 |
| 2020/0395863 A1* | 12/2020 | Song | .................... | G01R 19/175 |
| 2020/0403521 A1* | 12/2020 | Zheng | ............... | H02M 3/33507 |

* cited by examiner

US 11,031,876 B1

FLYBACK CIRCUIT WITH ENERGY RECYCLING AND CONTROL METHOD THEREOF

TECHNICAL FIELD

The present invention generally relates to electronic circuits, and more particularly, relates to flyback circuit and control methods thereof.

BACKGROUND

Since flyback circuits are widely applied in AC/DC converters, much research have been devoted to eliminating voltage spikes and reducing voltage stress in flyback circuits. Snubber circuits are often employed for their simplicity and low cost. FIG. 1 shows a conventional RCD snubber 10, comprising a clamp capacitor Csn, a snubber resistor Rsn and a diode Dsn. When a primary control signal Gp provided by a primary controller 11 turns off a primary switch Mp, a leakage inductance Lk of a transformer T1 transfer its leakage inductance energy to charge the clamp capacitor Csn via the diode Dsn. After charge process of the clamp capacitor Csn is over, the energy stored in the clamp capacitor Csn is consumed by the snubber resistor Rsn. Although voltage spikes of flyback circuits may be well suppressed, efficiency is limited for the leakage inductance energy is just burned out instead of being recycled.

Accordingly, a simple and low-costed solution to recycle the leakage inductance energy is required.

SUMMARY

The embodiments of the present invention are directed to a simple and low-costed solution to recycle the leakage inductance energy.

There has been provided, in accordance with an embodiment of the present invention, an energy recycle circuit for a flyback circuit, wherein the flyback circuit has a primary winding of a transformer and a primary switch coupled in series, the energy recycle circuit comprising: an auxiliary switch, coupled in series to a clamp capacitor to form a branch of the auxiliary switch and the clamp capacitor, wherein the branch is coupled in parallel with the primary winding, or the branch is coupled in parallel with the primary switch; and a recycle control circuit, configured to generate an auxiliary switching signal to control on and off of the auxiliary switch, wherein, the auxiliary switch is turned on during a charging process of the clamp capacitor, and is turned off at an end of an immediate subsequent discharging process of the clamp capacitor; wherein, the charging process of the clamp capacitor is monitored based on an auxiliary switch voltage signal and an auxiliary switch current signal, and is timed at a first length of time based on the auxiliary switch current signal; and wherein, the immediate subsequent discharging process of the clamp capacitor is timed at a second length of time based on the auxiliary switch current signal.

There has been provided, in accordance with an embodiment of the present invention, a method of recycling energy for an isolated voltage converter, wherein the isolated voltage converter has a primary winding of a transformer and a primary switch coupled in series, and has an auxiliary switch and a clamp capacitor coupled in series to form a branch of the auxiliary switch and the clamp capacitor, wherein the branch is coupled in parallel with the primary winding, or with the primary switch, the method comprising: turning off the primary switch; turning on the auxiliary switch during a charging process of the clamp capacitor based on an auxiliary switch voltage signal and an auxiliary switch current signal; timing the charging process of the clamp capacitor at a first length of time, and timing an immediate subsequent discharging process of the clamp capacitor at a second length of time; and turning off the auxiliary switch at an end of the immediate subsequent discharging process of the clamp capacitor.

There has been provided, in accordance with an embodiment of the present invention, a isolated voltage converter, comprising: a flyback circuit, comprising: a primary winding of a transformer; a primary switch coupled in series to the primary winding; and a clamp capacitor; an energy recycle circuit, comprising: an auxiliary switch, coupled in series to the clamp capacitor to form a branch of the auxiliary switch and the clamp capacitor, wherein the branch is coupled in parallel with the primary winding, or the branch is coupled in parallel with the primary switch; a recycle control circuit, configured to generate an auxiliary switching signal to control on and off of the auxiliary switch, wherein, the auxiliary switch is turned on during a charging process of the clamp capacitor, and is turned off at an end of an immediate subsequent discharging process of the clamp capacitor; wherein, the charging process of the clamp capacitor is monitored based on an auxiliary switch voltage signal and an auxiliary switch current signal, and is timed at a first length of time based on the auxiliary switch current signal; and wherein, the immediate subsequent discharging process of the clamp capacitor is timed at a second length of time based on the auxiliary switch current signal.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
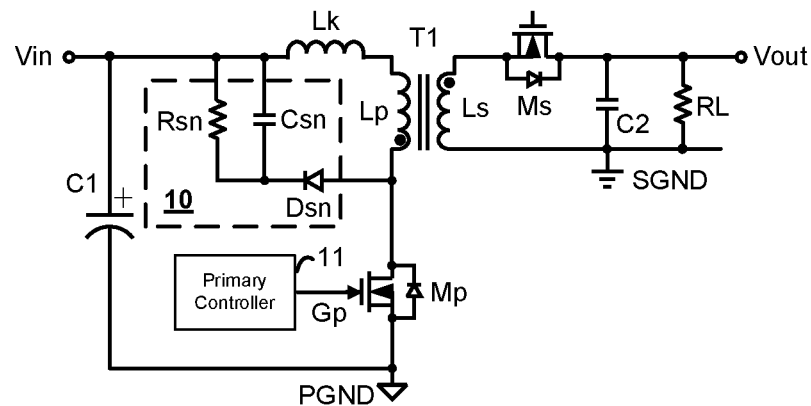
FIG. 1 shows a conventional RCD snubber 10.
Figure 2:
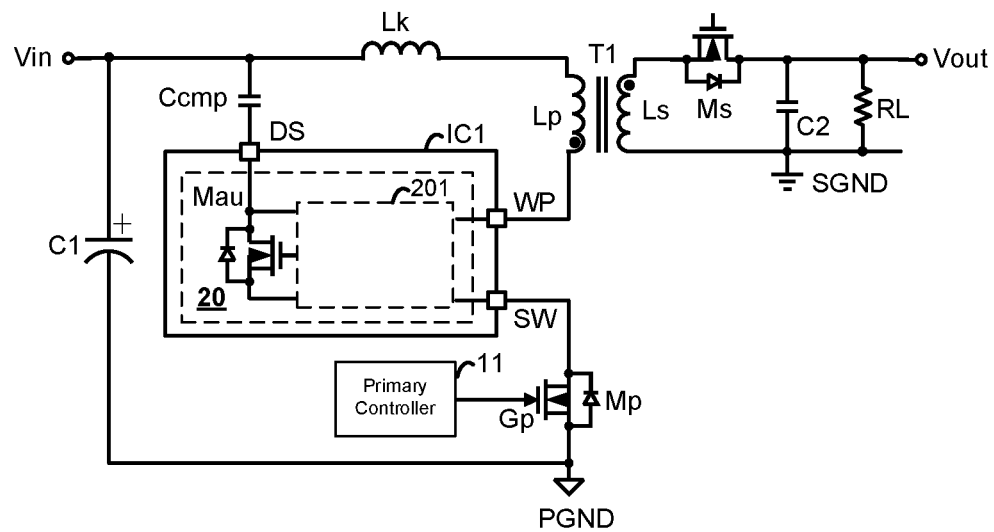
FIG. 2 schematically shows an energy recycle circuit 20 for a flyback circuit in accordance with an embodiment of the present invention.
Figure 3:
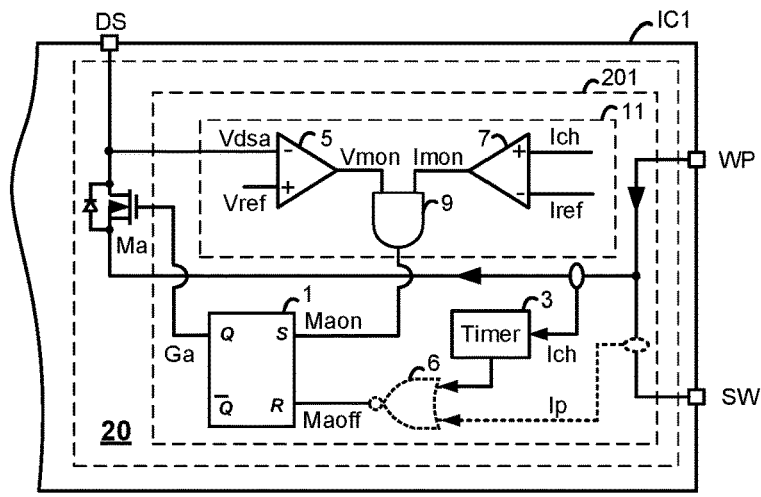
FIG. 3 shows the recycle control circuit 201 in accordance with an embodiment of the present invention.

FIG. 2 schematically shows an energy recycle circuit 20 for a flyback circuit in accordance with an embodiment of the present invention. The energy recycle circuit 20 comprises the auxiliary switch Ma coupled in series to the clamp capacitor Csn, and a recycle control circuit 201 configured to generate an auxiliary switching signal Vg to turn on and off the auxiliary switch Ma. In the example of FIG. 2, the auxiliary switch Ma and the energy recycle circuit 201 are integrated into a chip IC1, which has a first terminal WP, a second terminal SW and a third terminal DS. FIG. 3 shows the recycle control circuit 201 in accordance with an embodiment of the present invention. As shown in FIG. 2 and FIG. 3, persons of ordinary skills in the art will recognize, that the first terminal SW is coupled to a source terminal of the auxiliary switch Ma, the second terminal WP is coupled to the first terminal SW and coupled to the primary switch Mp, and the third terminal DS is coupled to a drain terminal of the auxiliary switch Ma. The energy recycle circuit 20 provides a simple plug-in solution to recycle the leakage energy of a transformer for any flyback circuit.

In the example of FIG. 3, the recycle control circuit 201 comprises an auxiliary switch on controller 11, a timer 3, and a logic circuit 1. The auxiliary switch on controller 11 is configured to generate an auxiliary switch on signal Maon based on an auxiliary switch voltage signal Vdsa and an auxiliary switch current signal Ich. The auxiliary switch voltage signal Vdsa is indicative of a drain-source voltage of the auxiliary switch Ma, and may be sensed in different ways, e.g. voltage divider or any other conventional voltage sensor. Similarly, the auxiliary switch current signal Ich is indicative of a current flowing through the auxiliary switch Ma, and may be sensed in different ways, e.g. current sensing resistor, current mirror or any other conventional current sensor. When the primary switch Mp is turned off, the leakage inductance Lk of the transformer T1 has to transfer its energy to the clamp capacitor Csn, so a current flows from the primary winding La and through a body diode of the auxiliary switch Ma, to charge the clamp capacitor Csn. Thus, the drain-source voltage of the auxiliary switch Ma decreases below zero due to forward voltage drop of the body diode, and the auxiliary switch Ma may be turned on with zero voltage.

The auxiliary switch on controller 11 comprises an auxiliary switch voltage comparator 5, an auxiliary switch current comparator 7 and an AND gate 9. The auxiliary switch voltage comparator is configured to compare the auxiliary switch voltage signal Vdsa with a reference voltage Vref, to generate an auxiliary switch voltage monitoring signal Vmon. When the auxiliary switch voltage signal Vdsa decreases below a voltage level of the reference voltage Vref, the auxiliary switch voltage monitoring signal Vmon flips to high level. The voltage level of the reference voltage Vref may be zero, or −300 mV, or any other applicable value. The auxiliary switch current comparator 7 is configured to compare the auxiliary switch current signal Ich and a first reference current Iref1, to generate an auxiliary switch current monitoring signal Imon. When the auxiliary switch current signal Ich increases to a current level of the current reference Iref, the auxiliary switch current monitoring signal Imon flips to high level. The current level of the first reference current Iref1 is different according to various applications. The AND gate 9 is configured to generate the auxiliary switch on signal Maon based on the auxiliary switch voltage monitoring signal Vmon and the auxiliary switch current monitoring signal Imon. Persons of ordinary skills in the art should know, the auxiliary switch Ma may be turned on at any moment in the charging process of the clamp capacitor Csn, as long as before the auxiliary switch current signal Ich turns negative.

After a charge process of the clamp capacitor Csn is over, according to the charge balance principle, an immediate subsequent discharge process of the clamp capacitor Csn starts. The timer 3 times the charging process and the immediate subsequent discharging process of the clamp capacitor Csn, so as to generate an auxiliary switch off signal Maoff at an end of the immediate subsequent discharging process of the clamp capacitor Csn, which will be described in detail later. In the example of FIG. 3, a primary switch current signal Ip is sensed to indicate whether a current flows into the primary switch through the second terminal. As shown in dashed lines, an OR gate 6 generates the auxiliary switch off signal Maoff based on the primary switch current signal Ip and an output of the timer 3. Once the primary switch current signal Ip indicates that a current flows into the primary switch Mp through the second terminal SW when the auxiliary switch is in on-state, it shows the primary switch Mp has been turned on and a shoot-through has aroused. The OR gate 6 generates the auxiliary switch off signal Maoff and the auxiliary switch Ma is turned off accordingly for protection.

Figure 4:
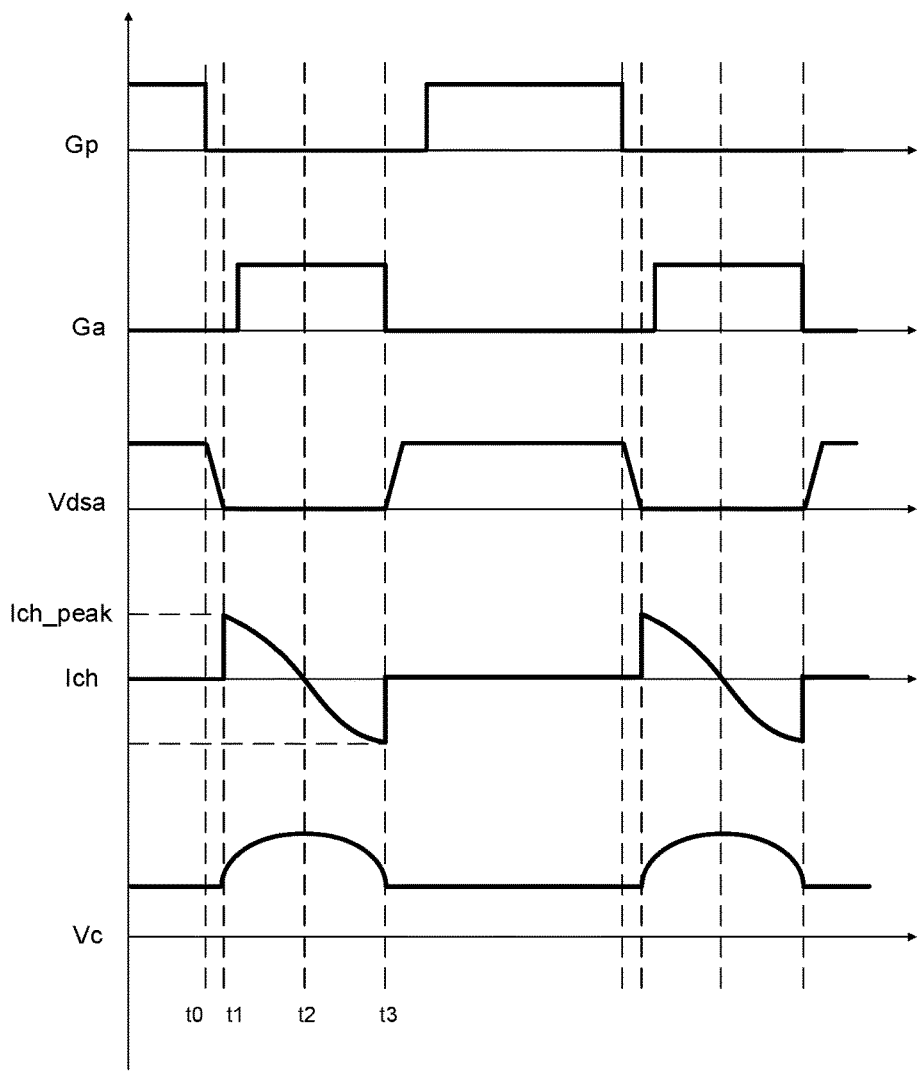
FIG. 4 shows waveforms of the signals in FIG. 3.

FIG. 4 shows waveforms of the signals in FIG. 3. At the time t0, the primary switch Mp is turned off based on a primary switching signal Gp. As described above, a current flows from the primary winding La to charge the clamp capacitor Csn through the body diode of the auxiliary switch Ma. At the time t1, the auxiliary switch voltage signal Vdsa decreases to zero, and the auxiliary switch current signal Ich increases to its positive peak value Ich_peak. During the time period t1-t2, the clamp capacitor Csn is charged, so a voltage Vc across the clamp capacitor Csn is increasing, while the auxiliary switch current signal Ich is decreasing from its positive peak value Ich_peak. At the time t2, the auxiliary switch current signal Ich decreases to zero. During the time period t2-t3, the clamp capacitor Csn is discharged, so the voltage Vc is decreasing, while the auxiliary switch current signal Ich is inversely increasing. At the time t3, the auxiliary switch current signal Ich increases to its negative peak value—Ich_peak. According to charge balance principle, the charging process of the clamp capacitor Csn (the time period t1-t2) has an equal time length with the discharging process of the clamp capacitor Csn (the time period t2-t3).

Figure 5:
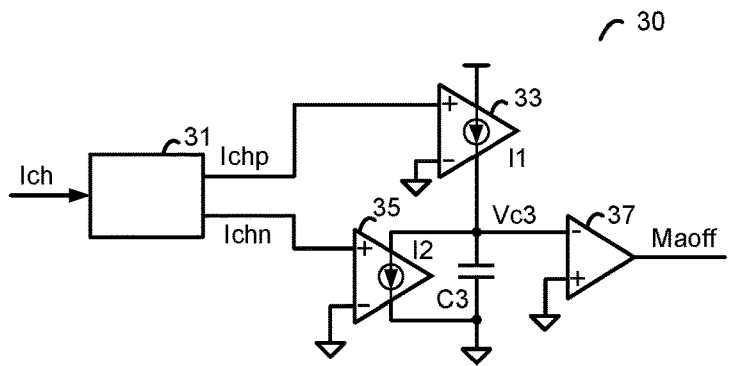
FIG. 5 shows a timer 30 in accordance with an embodiment of the present invention.
Figure 6:
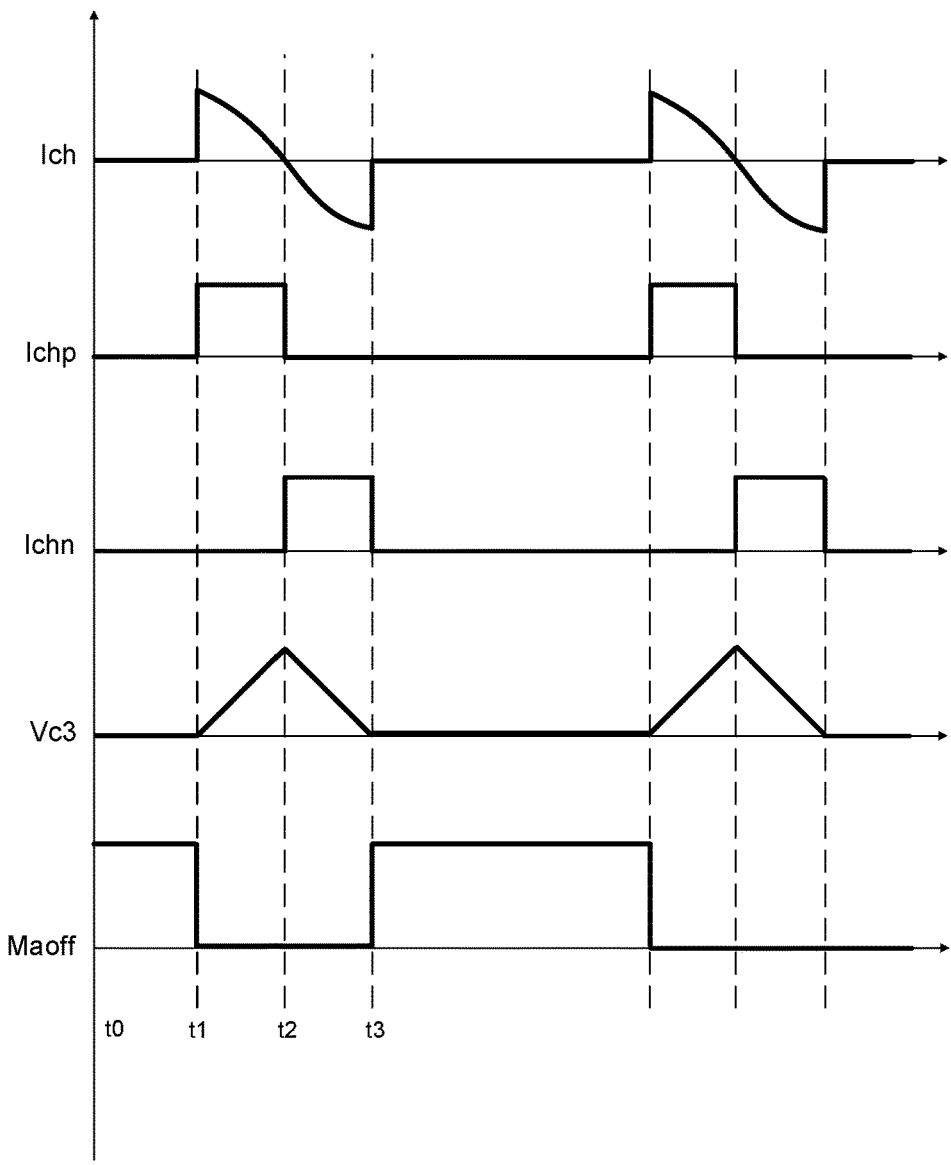
FIG. 6 shows waveforms of the signals in FIG. 5.

FIG. 5 shows a timer 30 in accordance with an embodiment of the present invention. FIG. 6 shows waveforms of the signals in FIG. 5. The timer 30 comprises an auxiliary switch current conversion circuit 31, a timing capacitor C3, a comparator 37, a first controlled current source 33, and a second controlled current source 35. The auxiliary switch current conversion circuit 31 is configured to receive the auxiliary switch current signal Ich to generate a positive half cycle signal Ichp and a negative half cycle signal Ichn. The positive half cycle signal Ichp has a window during the charging process of the clamp capacitor Csn, i.e. the positive half cycle signal Ichp is valid during the time period t1-t2. Similarly, the negative half cycle signal Ichn has a window during the discharging process of the clamp capacitor Csn, i.e. the negative half cycle Ichn is valid during the time period t2-t3. The first controlled current source 33 is configured to generate a first current I1 based on the positive half cycle signal Ichp to charge the timing capacitor C3. The second controlled current source 35 is configured to generate a second current I2 based on the negative half cycle signal Ichn to discharge the timing capacitor C3. Since the first current I1 and the second current I2 have the same current levels, a voltage Vc3 across the timing capacitor C3 is zero at the time t3. The comparator 37 is configured to compare the voltage Vc3 with zero voltage to generate the auxiliary switch off signal Maoff.

Figure 7:
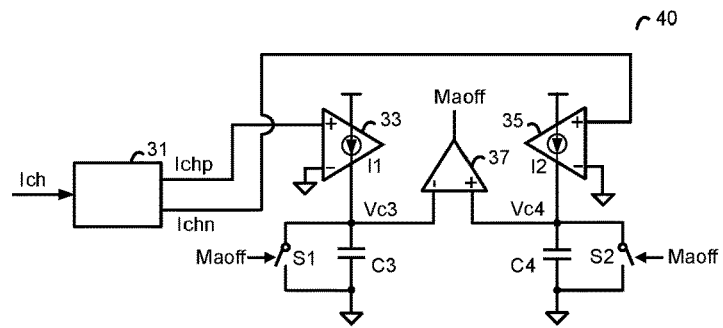
FIG. 7 shows a timer 40 in accordance with another embodiment of the present invention.
Figure 8:
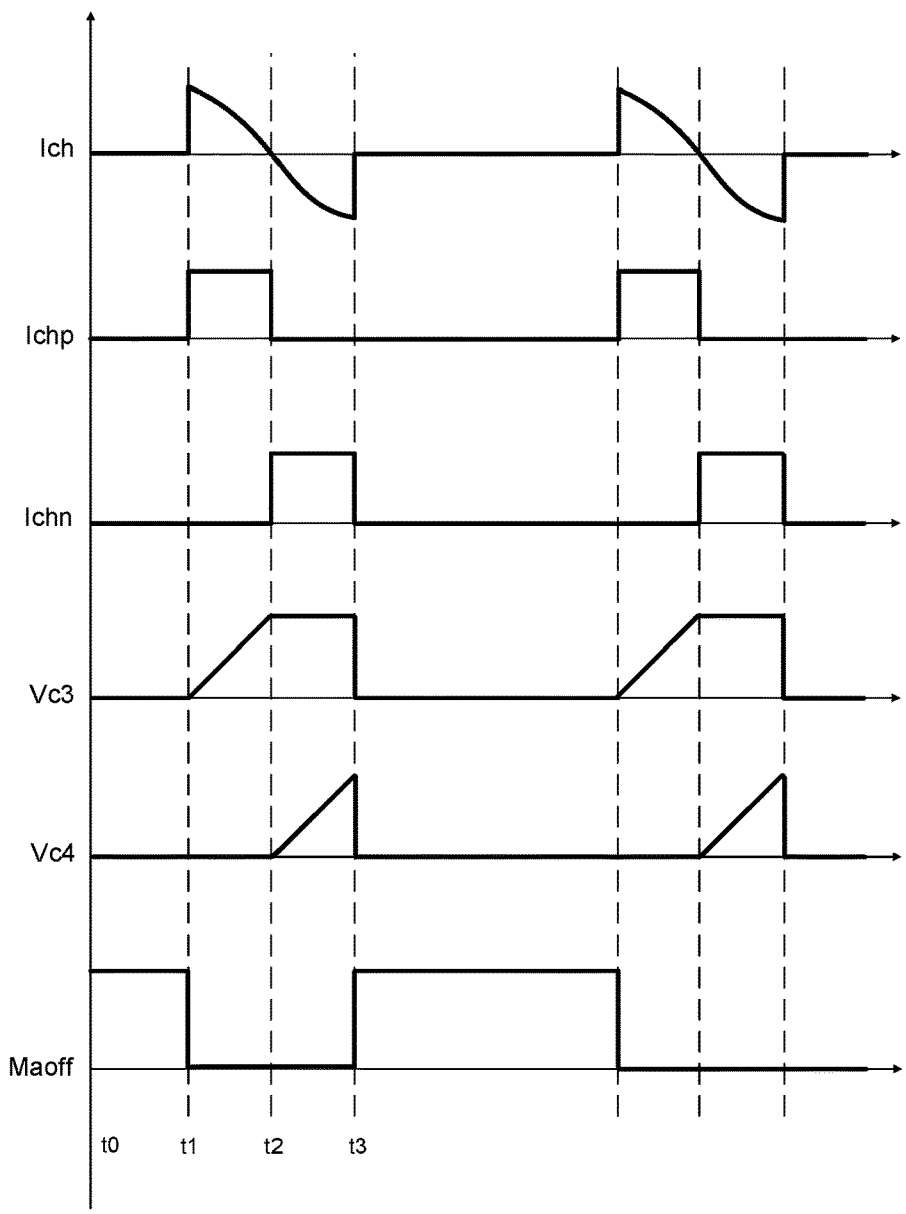
FIG. 8 shows waveforms of the signals in FIG. 7.

FIG. 7 shows a timer 40 in accordance with another embodiment of the present invention. FIG. 8 shows waveforms of the signals in FIG. 7. Different from FIG. 5, the timer 40 further comprises a second timing capacitor C4 apart from the first timing capacitor C3, a first controlled switch 51 coupled in parallel with the first timing capacitor C3, and a second controlled switch S2 coupled in parallel with the second timing capacitor C4. The first current I1 charges the first capacitor C3 during the time period t1-t2, while the second current I2 charges the second capacitor C4 during the time period t2-t3. The comparator 37 is configured to compare the voltage Vc3 across the first timing capacitor C3 with a voltage Vc4 across the second timing capacitor C4 to generate the auxiliary switch off signal Maoff.

In some embodiments, the positive half cycle signal Ichp and the negative half cycle signal Ichn are current signals per se, and the first controlled current source 33 and the second controlled current source 35 may be emitted accordingly. In another embodiment, the timer 3 may be implemented by digital. A zero-crossing point of the auxiliary switch current signal Ich is detected, and the auxiliary switch off signal Maoff is generated when a time equal with the time length of the charging process of the clamp capacitor Csn elapses from the zero-crossing point during the immediate discharging process of the clamp capacitor Csn.

Figure 9A:
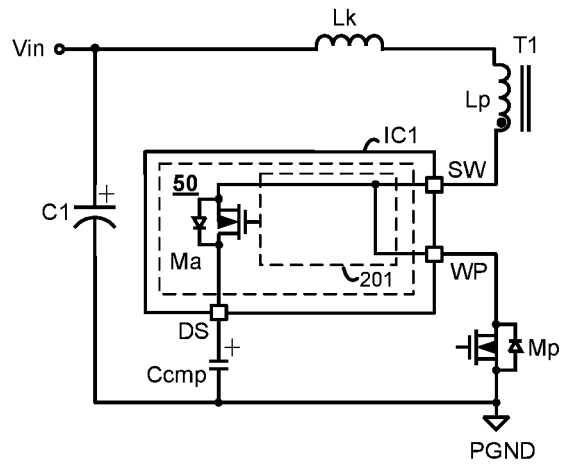
FIG. 9A shows an energy recycle circuit 50 in accordance with an embodiment of the present invention.
Figure 9B:
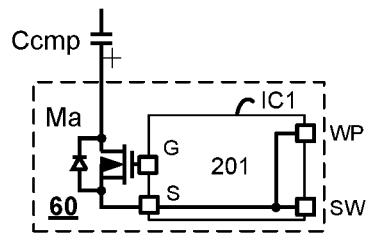
FIG. 9B shows an energy recycle circuit 60 in accordance with another embodiment of the present invention.

FIG. 9A shows an energy recycle circuit 50 in accordance with an embodiment of the present invention. In the example of FIG. 9A, the branch of the auxiliary switch Ma and the clamp capacitor Csn is coupled in parallel with the primary switch Mp. FIG. 9B shows an energy recycle circuit 60 in accordance with another embodiment of the present invention. In the example of FIG. 9B, the recycle control circuit 201 is integrated into the chip IC1, and the IC1 has a first terminal SW, a second terminal WP, a third terminal G coupled to a gate terminal of the auxiliary switch Ma, and a fourth terminal S coupled to the source terminal of the auxiliary switch Ma.

Figure 10:
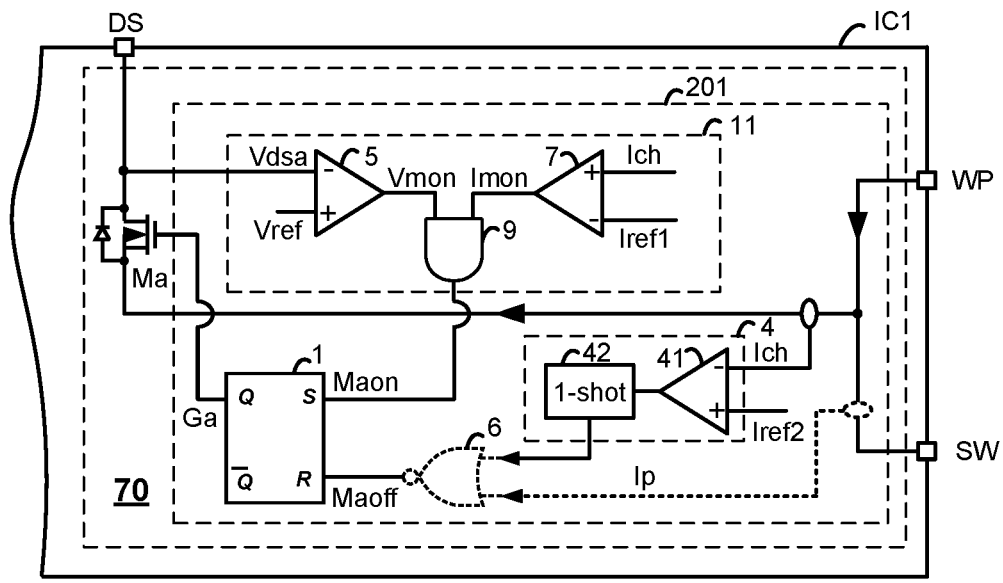
FIG. 10 shows an energy recycle circuit 70 in accordance with an embodiment of the present invention.
Figure 11:
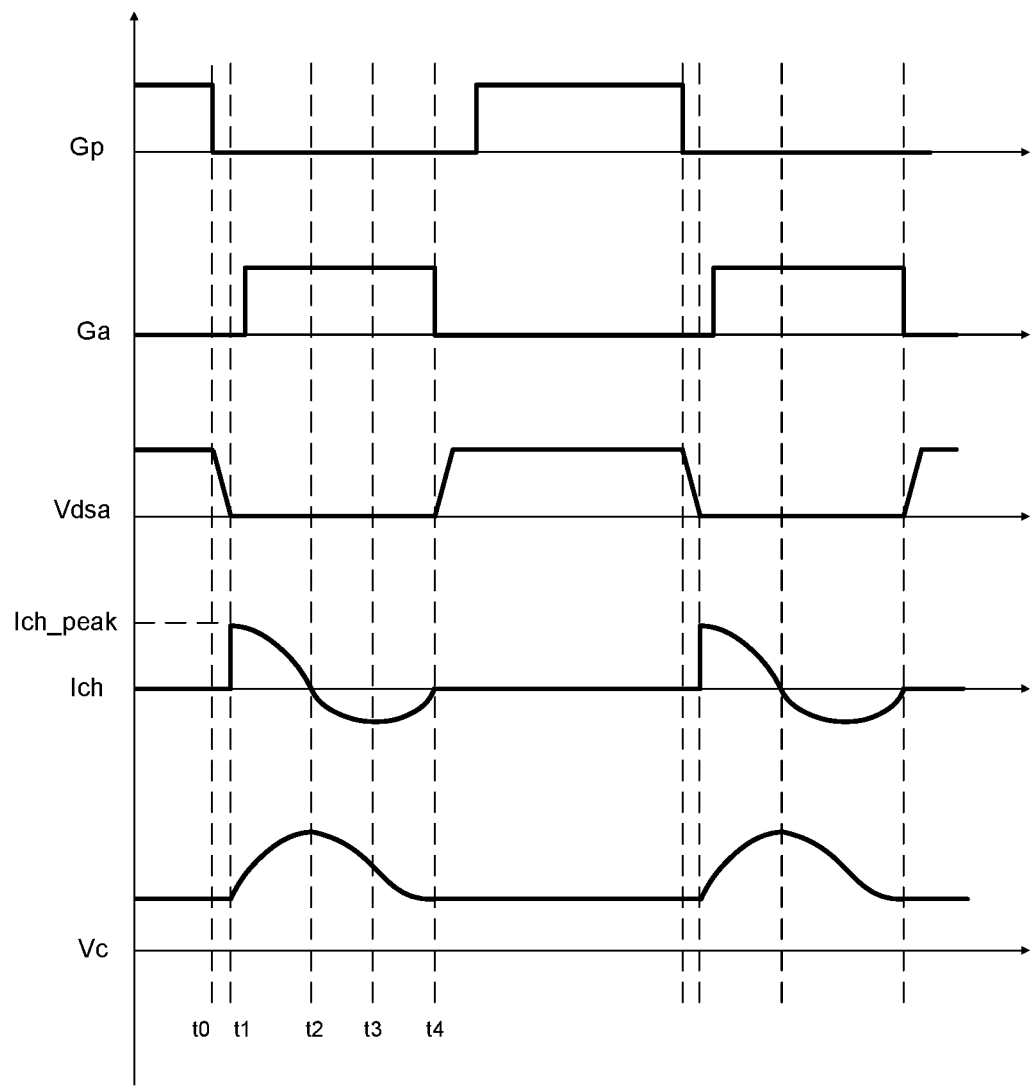
FIG. 11 shows waveforms of the signals in FIG. 10.

FIG. 10 shows an energy recycle circuit 70 in accordance with an embodiment of the present invention. In the example of FIG. 10, the auxiliary switch Ma is turned off when the auxiliary switch current signal Ich turns positive from negative at a zero-crossing point. Different from the above embodiments, the energy recycle circuit comprises a zero-crossing detector 4 configured to catch a negative-to-positive zero-crossing point of the auxiliary switch current signal Ich. As mentioned above, in the discharging process of the clamping capacitor Csn, the auxiliary switch current signal Ich will increases to a negative peak value. If the auxiliary switch Ma keeps on, the auxiliary switch current signal will decreases from this peak value to zero, and then turns positive. FIG. 11 shows waveforms of the signals in FIG. 10. In FIG. 11, the auxiliary switch current signal Ich arrives at the negative peak value at the time t3, and cross zero at the time t4. It should be noted that, the length of the time period t2-t4 (the discharging process of the clamping capacitor Csn), is not equal with the length of the time period t1-t2 (the charging process of the clamping capacitor Csn). This is because an averaged auxiliary switch current in the charging process is not equal with an averaged auxiliary switch current in the discharging process in this embodiment, which is different from the aforementioned embodiments. However the charge balance is still established, so the length of the time period t1-t2 is not equal with the length of the time period t2-t4.

The zero-crossing detector 4 comprises a zero current comparator 41 and a 1-shot circuit 42. The zero current comparator 41 is configured to compare the auxiliary switch current signal Ich with a second reference current Iref2. The second reference current Iref2 is typically around zero. The 1-shot circuit 42 is configured to receive an output signal of the zero current comparator 41 and generate a pulse based on the edge of the output signal, so as to catch the negative-to-positive zero-crossing point of the auxiliary switch current signal Ich. In the example of FIG. 10, the auxiliary switch current signal Ich is provided to an inverting terminal of the zero current comparator 41, and the second reference current Iref2 is provided at a non-inverting terminal of the zero current comparator 41, accordingly the 1-shot circuit 42 is configured to be triggered by a falling edge. In another embodiment, the auxiliary switch current signal Ich is provided to the non-inverting terminal of the zero current comparator 41, and the second reference current Iref2 is provided at the inventing terminal of the zero current comparator 41, accordingly the 1-shot circuit 42 is configured to be triggered by a rising edge. In other embodiments, the zero-current comparator may be implemented in any other conventional solution to catch the zero-crossing point.

Figure 12:
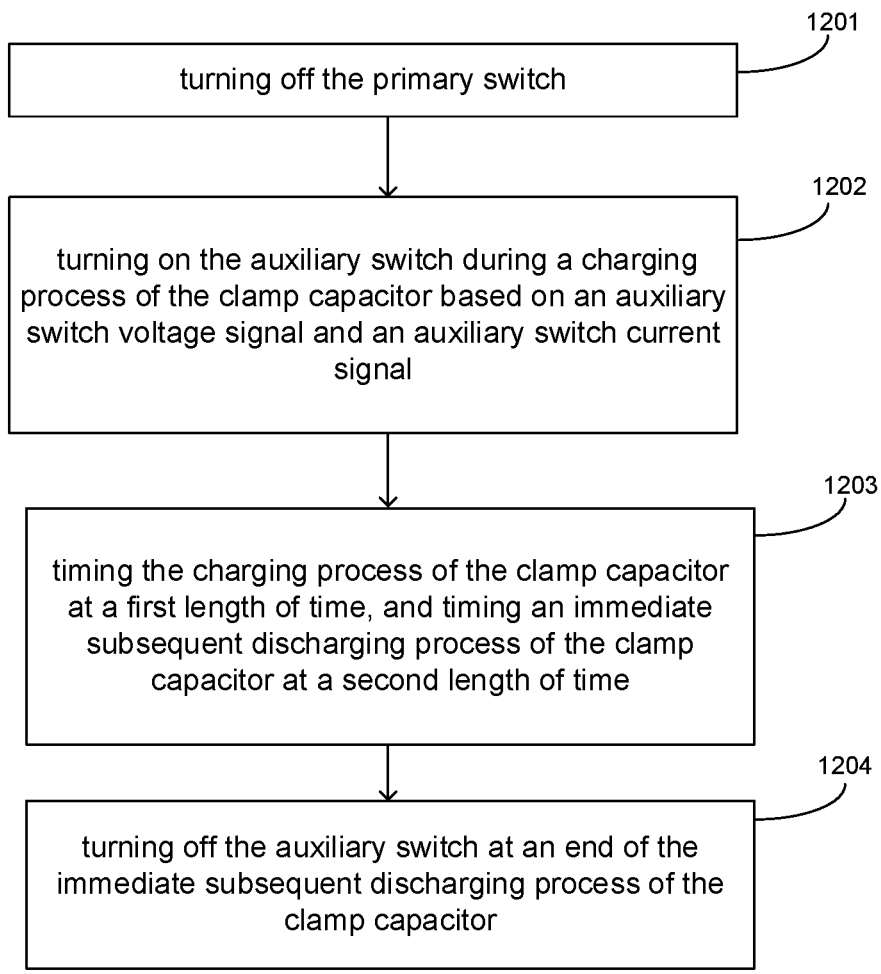
FIG. 12 illustrates a flow chart of a method of recycling energy for an isolate voltage converter in accordance with an embodiment of the present invention.

FIG. 12 illustrates a flow chart of a method of recycling energy for an isolate voltage converter in accordance with an embodiment of the present invention. The isolated voltage converter has a primary winding of a transformer and a primary switch coupled in series, and has an auxiliary switch and a clamp capacitor coupled in series to form a branch coupled in parallel with the primary winding, or with the primary switch, the method comprising:

Step 1201, turning off the primary switch;

Step 1202, turning on the auxiliary switch during a charging process of the clamp capacitor based on an auxiliary switch voltage signal and an auxiliary switch current signal;

Step 1203, timing the charging process of the clamp capacitor at a first length of time, and timing an immediate subsequent discharging process of the clamp capacitor at a second length of time; and Step 1204, turning off the auxiliary switch at an end of the immediate subsequent discharging process of the clamp capacitor.

In an embodiment of the present invention, the step of turning on the auxiliary switch during a charging process of the clamp capacitor comprises:

monitoring the charging process of the clamp capacitor based on the auxiliary switch voltage signal and the auxiliary switch current signal; and turning on the auxiliary switch after the auxiliary switch voltage signal decreases to zero and before the auxiliary switch current signal turns negative.

In an embodiment of the present invention, the second length of time is equal with the first length of time.

In another embodiment of the present invention, the second length of time is not equal with the first length of time, and the end of the immediate subsequent discharging process of the clamp capacitor is a zero-crossing point of the auxiliary switch current signal from negative to positive.

While specific embodiments of the present invention have been provided, it is to be understood that these embodiments are for illustration purposes and not limiting. Since the invention can be practiced in various forms without distracting the spirit or the substance of the invention, it should be understood that the above embodiments are not confined to any aforementioned specific detail, but should be explanatory broadly within the spirit and scope limited by the appended claims. Thus, all the variations and modification falling into the scope of the claims and their equivalents should be covered by the appended claims.

What is claimed is:

1. An energy recycle circuit for a flyback circuit, wherein the flyback circuit has a primary winding of a transformer and a primary switch coupled in series, the energy recycle circuit comprising:
   an auxiliary switch, coupled in series to a clamp capacitor to form a branch of the auxiliary switch and the clamp capacitor, wherein the branch is coupled in parallel with the primary winding, or the branch is coupled in parallel with the primary switch; and
   a recycle control circuit, configured to generate an auxiliary switching signal to control on and off of the auxiliary switch, wherein, the auxiliary switch is turned on during a charging process of the clamp capacitor, and is turned off at an end of an immediate subsequent discharging process of the clamp capacitor;
   wherein, the charging process of the clamp capacitor is monitored based on an auxiliary switch voltage signal and an auxiliary switch current signal, and is timed at a first length of time based on the auxiliary switch current signal;
   wherein, the immediate subsequent discharging process of the clamp capacitor is timed at a second length of time based on the auxiliary switch current signal;
   wherein, the second length of time has an equal time length with the first length of time, and wherein the recycle control circuit comprises a timer configured to generate an auxiliary switch off signal, the timer comprising:
   an auxiliary switch current conversion circuit, configured to receive the auxiliary switch current signal and to generate a positive half cycle signal valid during the charging process of the clamp capacitor, and a negative half cycle signal valid during the discharging process of the clamp capacitor;
      a timing capacitor, configured to be charged based on the positive half cycle signal and to be discharged based on the negative half cycle signal; and
      a comparator, configured to compare a voltage across the timing capacitor with zero voltage, and to generate the auxiliary switch off signal;
   wherein, the timer further comprises:
      a first controlled current source, configured to generate a first current based on the positive half cycle signal to charge the timing capacitor; and
      a second controlled current source, configured to generate a second current based on the negative half cycle signal to discharge the timing capacitor;
      wherein, the first current and the second current have the same current levels.

2. The energy recycle circuit of claim 1, wherein, at least the recycle control circuit is integrated into an IC, wherein the IC at least comprises:
   a first terminal coupled to a source terminal of the auxiliary switch, a second terminal coupled to the first terminal, and a third terminal coupled to a drain terminal of the auxiliary switch;
   wherein, the second terminal is coupled to the primary switch.

3. The energy recycle circuit of claim 2, wherein, the auxiliary switch is turned off when a primary switch current signal indicates that a current flows into the primary switch through the second terminal.

4. A method of recycling energy for an isolated voltage converter, wherein the isolated voltage converter has a primary winding of a transformer and a primary switch coupled in series, and has an auxiliary switch and a clamp capacitor coupled in series to form a branch of the auxiliary switch and the clamp capacitor, wherein the branch is coupled in parallel with the primary winding, or with the primary switch, the method comprising:
   turning off the primary switch;
   turning on the auxiliary switch during a charging process of the clamp capacitor based on an auxiliary switch voltage signal and an auxiliary switch current signal;
   timing the charging process of the clamp capacitor at a first length of time, and timing an immediate subsequent discharging process of the clamp capacitor at a second length of time;
   turning off the auxiliary switch at an end of the immediate subsequent discharging process of the clamp capacitor;
   wherein the second length of time has an equal time length with the first length of time, and wherein the step of timing the charging process and an immediate subsequent discharging process of the clamp capacitor comprises:
      charging a timing capacitor with a first current during a positive half cycle of the auxiliary switch current signal; and
      discharging the timing capacitor with a second current during a negative half cycle of the auxiliary switch current signal;
      wherein the first current and the second current have the same current levels; and
   wherein the step of turning off the auxiliary switch at an end of the immediate subsequent discharging process of the clamp capacitor further comprises comparing a voltage across the timing capacitor with a zero voltage.

5. An isolated voltage converter, comprising:
   a flyback circuit, comprising:
      a primary winding of a transformer;
      a primary switch coupled in series to the primary winding; and
      a clamp capacitor;
   an energy recycle circuit, comprising:
      an auxiliary switch, coupled in series to the clamp capacitor to form a branch of the auxiliary switch and the clamp capacitor, wherein the branch is coupled in parallel with the primary winding, or the branch is coupled in parallel with the primary switch;
      a recycle control circuit, configured to generate an auxiliary switching signal to control on and off of the auxiliary switch, wherein, the auxiliary switch is turned on during a charging process of the clamp capacitor, and is turned off at an end of an immediate subsequent discharging process of the clamp capacitor;

wherein, the charging process of the clamp capacitor is monitored based on an auxiliary switch voltage signal and an auxiliary switch current signal, and is timed at a first length of time based on the auxiliary switch current signal;

wherein, the immediate subsequent discharging process of the clamp capacitor is timed at a second length of time based on the auxiliary switch current signal;

wherein the second length of time has an equal time length with the first length of time, and wherein the recycle control circuit comprises a timer configured to generate an auxiliary switch off signal, the timer comprising:

an auxiliary switch current conversion circuit, configured to receive the auxiliary switch current signal and to generate a positive half cycle signal valid during the charging process of the clamp capacitor, and a negative half cycle signal valid during the discharging process of the clamp capacitor;

a timing capacitor, configured to be charged based on the positive half cycle signal and to be discharged based on the negative half cycle signal; and a comparator, configured to compare a voltage across the timing capacitor with zero voltage, and to generate the auxiliary switch off signal;

wherein the timer further comprises:

a first controlled current source, configured to generate a first current based on the positive half cycle signal to charge the timing capacitor; and a second controlled current source, configured to generate a second current based on the negative half cycle signal to discharge the timing capacitor;

wherein, the first current and the second current have the same current levels.

6. An energy recycle circuit for a flyback circuit, wherein the flyback circuit has a primary winding of a transformer and a primary switch coupled in series, the energy recycle circuit comprising:

an auxiliary switch, coupled in series to a clamp capacitor to form a branch of the auxiliary switch and the clamp capacitor, wherein the branch is coupled in parallel with the primary winding, or the branch is coupled in parallel with the primary switch;

a recycle control circuit, configured to generate an auxiliary switching signal to control on and off of the auxiliary switch, wherein, the auxiliary switch is turned on during a charging process of the clamp capacitor, and is turned off at an end of an immediate subsequent discharging process of the clamp capacitor;

wherein, the charging process of the clamp capacitor is monitored based on an auxiliary switch voltage signal and an auxiliary switch current signal, and is timed at a first length of time based on the auxiliary switch current signal;

wherein, the immediate subsequent discharging process of the clamp capacitor is timed at a second length of time based on the auxiliary switch current signal;

wherein the second length of time has an equal time length with the first length of time, and wherein the recycle control circuit comprises a timer configured to generate an auxiliary switch off signal, the timer comprising:

an auxiliary switch current conversion circuit, configured to receive the auxiliary switch current signal and to generate a positive half cycle signal valid during the charging process of the clamp capacitor, and a negative half cycle signal valid during the discharging process of the clamp capacitor;

a first timing capacitor, configured to be charged based on the positive half cycle signal;

a second timing capacitor, configured to be charged based on the negative half cycle signal;

a first controlled switch, coupled in parallel with the first timing capacitor, and configured to be controlled by the auxiliary switch off signal;

a second controlled switch, coupled in parallel with the second timing capacitor, and configured to be controlled by the auxiliary switch off signal; and a comparator, configured to compare a voltage across the first timing capacitor and a voltage across the second timing capacitor, and to generate the auxiliary switch off signal.

7. The energy recycle circuit of claim 6, wherein the timer further comprises:

a first controlled current source, configured to generate a first current based on the positive half cycle signal to charge the first timing capacitor; and a second controlled current source, configured to generate a second current based on the negative half cycle signal to charge the second timing capacitor;

wherein, the first current and the second current have the same current levels.

8. An isolated voltage converter, comprising:

a flyback circuit, comprising:

a primary winding of a transformer;

a primary switch coupled in series to the primary winding; and a clamp capacitor;

an energy recycle circuit, comprising:

an auxiliary switch, coupled in series to the clamp capacitor to form a branch of the auxiliary switch and the clamp capacitor, wherein the branch is coupled in parallel with the primary winding, or the branch is coupled in parallel with the primary switch;

a recycle control circuit, configured to generate an auxiliary switching signal to control on and off of the auxiliary switch, wherein, the auxiliary switch is turned on during a charging process of the clamp capacitor, and is turned off at an end of an immediate subsequent discharging process of the clamp capacitor;

wherein, the charging process of the clamp capacitor is monitored based on an auxiliary switch voltage signal and an auxiliary switch current signal, and is timed at a first length of time based on the auxiliary switch current signal;

wherein, the immediate subsequent discharging process of the clamp capacitor is timed at a second length of time based on the auxiliary switch current signal;

wherein the second length of time has an equal time length with the first length of time, and wherein the recycle control circuit comprises a timer configured to generate an auxiliary switch off signal, the timer comprising:

an auxiliary switch current conversion circuit, configured to receive the auxiliary switch current signal and to generate a positive half cycle signal valid during the charging process of the clamp capacitor, and a negative half cycle signal valid during the discharging process of the clamp capacitor;

a first timing capacitor, configured to be charged based on the positive half cycle signal;

a second timing capacitor, configured to be charged based on the negative half cycle signal;

a first controlled switch, coupled in parallel with the first timing capacitor, and configured to be controlled by the auxiliary switch off signal;

a second controlled switch, coupled in parallel with the second timing capacitor, and configured to be controlled by the auxiliary switch off signal; and a comparator, configured to compare a voltage across the first timing capacitor and a voltage across the second timing capacitor, and to generate the auxiliary switch off signal.

9. The isolated voltage converter of claim 8, wherein the timer further comprises:

a first controlled current source, configured to generate a first current based on the positive half cycle signal to charge the first timing capacitor; and a second controlled current source, configured to generate a second current based on the negative half cycle signal to charge the second timing capacitor;

wherein, the first current and the second current have the same current levels.

10. A method of recycling energy for an isolated voltage converter, wherein the isolated voltage converter has a primary winding of a transformer and a primary switch coupled in series, and has an auxiliary switch and a clamp capacitor coupled in series to form a branch of the auxiliary switch and the clamp capacitor, wherein the branch is coupled in parallel with the primary winding, or with the primary switch, the method comprising:

turning off the primary switch;

turning on the auxiliary switch during a charging process of the clamp capacitor based on an auxiliary switch voltage signal and an auxiliary switch current signal;

timing the charging process of the clamp capacitor at a first length of time, and timing an immediate subsequent discharging process of the clamp capacitor at a second length of time;

turning off the auxiliary switch at an end of the immediate subsequent discharging process of the clamp capacitor;

wherein the second length of time has an equal time length with the first length of time, and wherein the step of timing the charging process and an immediate subsequent discharging process of the clamp capacitor comprises:

charging a first timing capacitor with a first current during a positive half cycle of the auxiliary switch current signal; and charging a second timing capacitor with a second current during a negative half cycle of the auxiliary switch current signal;

wherein the first current and the second current have the same current levels; and wherein the step of turning off the auxiliary switch at an end of the immediate subsequent discharging process of the clamp capacitor further comprises:

comparing a voltage across the first timing capacitor and a voltage across the second timing capacitor.

11. The method of claim 10, wherein the step of turning off the auxiliary switch at an end of the immediate subsequent discharging process of the clamp capacitor further comprises:

discharging the first timing capacitor and the second timing capacitor after the auxiliary switch is turned off.

* * * * *